United States Patent
Hallaq et al.

(10) Patent No.: US 11,531,971 B2
(45) Date of Patent: Dec. 20, 2022

(54) COMPUTER-BASED SYSTEMS AND DEVICE CONFIGURED FOR ELECTRONIC AUTHENTICATION AND VERIFICATION OF DOCUMENTS AND METHODS THEREOF

(71) Applicant: Capital One Services, LLC, McLean, VA (US)

(72) Inventors: Laith Hallaq, Manassas Park, VA (US); Ruby Rue Roman Estremera, Reston, VA (US); Maneill Parekh, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 127 days.

(21) Appl. No.: 17/010,188

(22) Filed: Sep. 2, 2020

(65) Prior Publication Data

US 2022/0067673 A1 Mar. 3, 2022

(51) Int. Cl.
*G06Q 20/04* (2012.01)
*G06F 21/31* (2013.01)
(Continued)

(52) U.S. Cl.
CPC .......... *G06Q 20/042* (2013.01); *G06F 21/31* (2013.01); *G06Q 20/3278* (2013.01);
(Continued)

(58) Field of Classification Search
CPC ............ G06Q 20/042; G06Q 20/3278; G06Q 30/0201; G06Q 30/0261; G06Q 30/0267;
(Continued)

(56) References Cited

U.S. PATENT DOCUMENTS

| | | | | |
|---|---|---|---|---|
| 6,061,660 A | * | 5/2000 | Eggleston | .......... G06Q 30/0239 705/14.12 |
| 6,460,036 B1 | * | 10/2002 | Herz | .................... H04N 21/454 348/E7.071 |
| 6,944,650 B1 | * | 9/2005 | Urien | .................... H04L 67/568 709/200 |

(Continued)

FOREIGN PATENT DOCUMENTS

WO   WO-2021050205 A1 * 3/2021 ......... G06K 19/0709

*Primary Examiner* — Alexander G Kalinowski
*Assistant Examiner* — Sanjeev Malhotra
(74) *Attorney, Agent, or Firm* — Greenberg Traurig, LLP

(57) ABSTRACT

Systems and methods of the present disclosure include processors configured to perform steps to receive a tag data from a contactless communication tag, execute an applet associated with the contactless communication tag, and receive document data associated with an applet-linked document, including a document identifier, a document content data, a document recipient identifier, and a document sender identifier. The processors are configured to further generate an account link linking the document data to a user account associated with the document sender, generate a document entry in the user account based on the account link, generate a webpage from the applet to record the document data such that the document data is accessible upon subsequent reception of the contactless radio signal data, and display the document data and a current status of the applet-linked document on a display of the computing device associated with the contactless reader.

18 Claims, 11 Drawing Sheets

(51) Int. Cl.
*H04L 67/306* (2022.01)
*G06Q 20/32* (2012.01)
*H04M 1/725* (2021.01)
*H04L 9/40* (2022.01)

(52) U.S. Cl.
CPC .......... *H04L 63/102* (2013.01); *H04L 67/306* (2013.01); *H04M 1/725* (2013.01)

(58) Field of Classification Search
CPC ........ G06Q 99/00; G06Q 20/40; G06F 21/31; H04L 63/102; H04L 67/306; H04M 1/725; G06K 7/10366; H04W 4/02
USPC ... 705/7.14, 7.29, 14.12, 14.39, 14.4, 14.46, 705/14, 66, 17, 26.8, 30, 37, 41, 44, 72, 705/342, 344; 707/E17.008; 348/E7.071; 382/113; 709/200
See application file for complete search history.

(56) References Cited

U.S. PATENT DOCUMENTS

| | | | | |
|---|---|---|---|---|
| 7,054,830 | B1* | 5/2006 | Eggleston | G06Q 30/0225 705/14.39 |
| 2001/0034721 | A1* | 10/2001 | Boudreau | G07F 7/1008 705/72 |
| 2002/0029161 | A1* | 3/2002 | Brodersen | G06Q 10/1093 705/7.14 |
| 2003/0046156 | A1* | 3/2003 | Cromer | G06Q 30/02 705/14.46 |
| 2005/0021346 | A1* | 1/2005 | Nadan | G06Q 40/04 705/37 |
| 2007/0083444 | A1* | 4/2007 | Matthews | G06Q 30/0215 705/30 |
| 2007/0150299 | A1* | 6/2007 | Flory | H04L 63/20 705/344 |
| 2008/0130955 | A1* | 6/2008 | Harrison | G06Q 10/10 382/113 |
| 2008/0288362 | A1* | 11/2008 | King | G06Q 30/0641 705/26.8 |
| 2009/0150169 | A1* | 6/2009 | Kirkwood | G06Q 40/00 705/342 |
| 2011/0231268 | A1* | 9/2011 | Ungos | G06Q 20/3274 705/17 |
| 2012/0047022 | A1* | 2/2012 | Shamim | G06Q 30/0269 705/14.66 |
| 2012/0215686 | A1* | 8/2012 | Lauzon | H04L 12/66 707/E17.008 |
| 2013/0254111 | A1* | 9/2013 | Gonser | G06F 40/174 705/44 |
| 2014/0136303 | A1* | 5/2014 | Rothschild | G06Q 30/0613 705/14.4 |
| 2014/0188725 | A1* | 7/2014 | Reardon | G06Q 20/26 705/44 |
| 2014/0324527 | A1* | 10/2014 | Kulkarni | G06Q 30/0261 705/7.29 |
| 2015/0019418 | A1* | 1/2015 | Hotard | G06Q 20/3226 705/41 |
| 2016/0189174 | A1* | 6/2016 | Heath | G06Q 30/0201 705/7.29 |

* cited by examiner

COMPUTER-BASED SYSTEMS AND DEVICE CONFIGURED FOR ELECTRONIC AUTHENTICATION AND VERIFICATION OF DOCUMENTS AND METHODS THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC, All Rights Reserved.

FIELD OF TECHNOLOGY

The present disclosure generally relates to improved computer-based systems and devices configured for electronic authentication and verification of documents, e.g., using contactless chips and readers thereof for maintaining verifiable data representing document information, and methods of use thereof.

BACKGROUND OF TECHNOLOGY

Many situations require the use of hard-copy documents, transferred between individuals or entities too effectuate some agreement, transfer or other activity. However, such hard-copy documents are inherently un-trackable in that only the current possessor of the document knows the location and status of the document. Typically, to track the document, e.g., to verify authenticity or status, the current possessor must input information into a log or record. However, this results in a log that is inefficient and only as trustworthy as the person logging the details.

Summary of Described Subject Matter

In some embodiments, the present disclosure provides an exemplary computer-based method that includes at least the following steps of receiving, by at least one processor of at least one computing device via an antenna module from a contactless reader of the at least one computing device, a contactless radio signal data, including encoded tag data associated with a contactless communication tag, where the tag data includes a tag identifier and an applet identifier; executing, by the at least one processor, an applet associated with the contactless communication tag based on the tag data; receiving, by the at least one processor, document data associated with an applet-linked document, where the document data includes: a document identifier, a document content data, a document recipient identifier indicating a document recipient, and a document sender identifier indicating a document sender; generating, by the at least one processor, an account link that links the document data to a user account associated with the document sender; generating, by the at least one processor, a document entry in the user account based on the account link, wherein the document entry comprises the document content data; and generating, by the at least one processor, a webpage from the applet to record the document data such that the document data is accessible upon subsequent reception of the contactless radio signal data; and causing to display, by the at least one processor, the document data and a current status of the applet-linked document on a display of the at least one computing device associated with the contactless reader.

In some embodiments, the present disclosure provides an exemplary computer-based method that includes at least the following steps of receiving, by at least one processor of at least one computing device via an antenna module from a contactless reader of the at least one computing device, a contactless radio signal, including encoded tag data associated with a contactless communication tag from a contactless reader associated with a document possessor; where the tag data includes a tag identifier and a promissory applet identifier; executing, by the at least one processor, an applet associated with the contactless communication tag based on the tag data; receiving, by the at least one processor, a webpage conveying document data associated with an applet-linked document based on the applet, where the document data includes: a document identifier, document content data, a document recipient identifier indicating a document recipient, and a document sender identifier indicating a document sender; matching, by the at least one processor, the document recipient with the document possessor based on the document recipient identifier; generating, by the at least one processor, an account link linking the document data to a user account associated with the document possessor where the document possessor matches the document recipient; generating, by the at least one processor, a document entry in the user account based on the account link, wherein the document entry comprises the document content data; transferring, by the at least one processor, a quantity from a sender account linked to the document sender identifier to the user account based on the document content data; updating, by the at least one processor, a current status of the applet-linked document to indicate the transfer of the quantity; and updating, by the at least one processor, the webpage to indicate the current status of the applet-linked document.

In some embodiments, the present disclosure provides an exemplary computer-based system that includes at least the following components of at least one processor of at least one computing device via an antenna module from a contactless reader of the at least one computing device. The at least one processor is configured to implement instructions causing the at least one processor to perform steps to: receive a contactless radio signal data, including encoded tag data associated with a contactless communication tag; where the tag data includes a tag identifier and an applet identifier; execute an applet associated with the contactless communication tag based on the tag data; receive document data associated with an applet-linked document, where the document data includes: a document identifier, a document content data, a document recipient identifier indicating a document recipient, and a document sender identifier indicating a document sender; generate an account link linking the document data to a user account associated with the document sender; generate a document entry in the user account based on the account link, wherein the document entry comprises the document content data; generate a webpage from the applet to record the document data such that the document data is accessible upon subsequent reception of the contactless radio signal data; and cause to display the document data and a current status of the applet-linked document on a display of the at least one computing device associated with the contactless reader.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
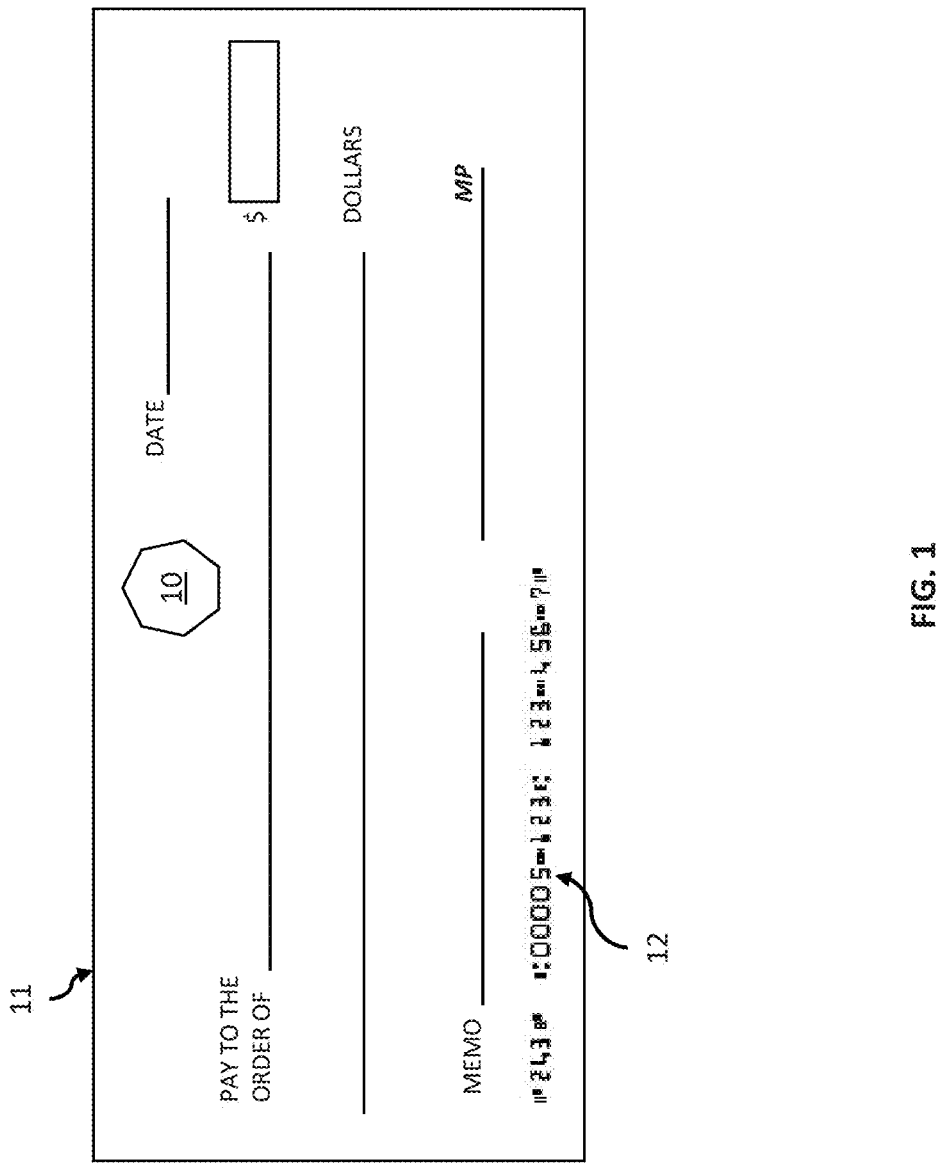
FIGS. 1-11 show one or more schematic flow diagrams, certain computer-based architectures, and/or screenshots of various specialized graphical user interfaces which are illustrative of some exemplary aspects of at least some embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 11 illustrate systems and methods of document identification and tracking. The following embodiments provide technical solutions and technical improvements that overcome technical problems, drawbacks and/or deficiencies in the technical fields involving account transfers via physical documents including authenticity verification and status tracking. As explained in more detail, below, technical solutions and technical improvements herein include aspects of improved fraud and anomaly detection during the user of physical documents for account transfers using virtual representations of the document in an electronic document tag to maintain a verifiable method for all parties involved. For example, checkbook stock or companion labels may be embedded with radio-frequency identification (RFID), near-field communication (NFC) or other contactless chip tags. The check stock or labels may be printed with serialized numbering for the document owner's use such that anytime the check is written, the account holder logs the check transaction details according to the serial number into a registry, portal or other solution. Thus, the document owner, document recipient, or account institution can, at any time, verify the document information and status thereof for authenticity with a tap of the contactless tag, thus providing up-to-date, verifiable document histories and authenticity, improving fraud and security monitoring thereof. Based on such technical features, further technical benefits become available to users and operators of these systems and methods. Moreover, various practical applications of the disclosed technology are also described, which provide further practical benefits to users and operators that are also new and useful improvements in the art.

FIG. 1 is a block diagram of an exemplary document with accompanying contactless tag for document verification and authentication in accordance with one or more embodiments of the present disclosure.

In some embodiments, a physical document 11, such as, e.g., a personal check, a cashier's check, a travelers check, a contract, a lease, a legal document or will, signed memorabilia, or other physical document reliant on authenticity, may be augmented with a contactless communication tag 10. In some embodiments, the contactless communication tag 10 can include any passive or active electronic device for emitting electromagnetic fields carrying document-related data and information. For example, the contactless communication tag 10 may be a radio frequency identification (RFID) chip or near field communication (NFC) chip, or other similar electromagnetic signal emitting circuitry.

In some embodiments, document 11 may include any document that can benefit from electronic authentication. For example, the document 11 may include a check having information specified thereon, such as, e.g., a document identifier 12, account number, contents, such as currency amount (e.g., dollar amount), recipient identifier, memo information, signature, date, and other information. Thus, the contactless communication tag 10 can be paired with the document 11 to provide verification and authentication of the document information by storing data representative of the document information (e.g., document data) as tag data carried by the electromagnetic fields.

In some embodiments, the tag data including the document data can be read by any tag reader or interrogator device that is suitable for receiving the electromagnetic fields emitted by the contactless communication tag 10. Thus, the tag data can be compared with, e.g., account data, financial instruction records data, and other data to verify the contents of the document data as matching the document information set forth on the document 11 itself. Moreover, the reading of the tag data can also be used to record actions relative to the document 11, such as, e.g., transfers to new entities, deposits of funds set forth on the document 11, execution of an agreement, invalidation of the document 11, or other actions relative to the document 11 to record a current status of the document 11. As a result, the originator or sender of the document 11, recipient of the document 11, transferee of the document 11, financial institution of the account of the sender or recipient, or other authorized party may access and determine the current status of the document 11. As a result, the contactless communication tag 10 enables real-time tracking of document statuses as well as verification and authorization of the authenticity of the document 11 and record, e.g., chain of title, chain of possession, or other document authenticity characteristics.

Figure 2B:
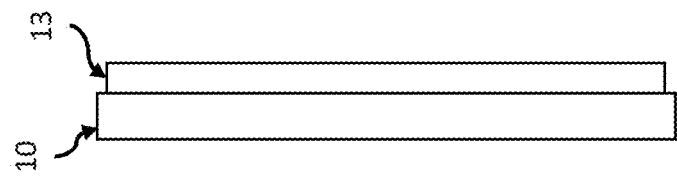
Figure 2A:
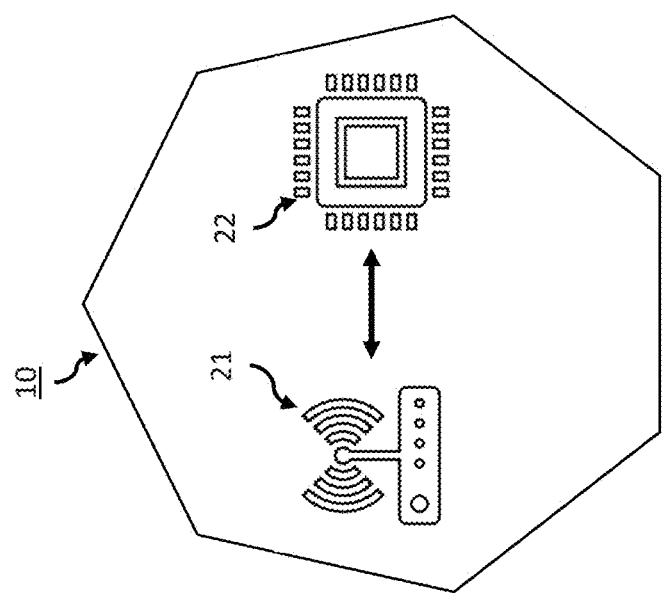

FIGS. 2A and 2B are diagrams of another exemplary contactless tag for document verification and authentication in accordance with one or more embodiments of the present disclosure.

In some embodiments, the contactless communication tag 10 can include multiple components for tracking and authenticating documents such as document 11 described above, or other documents. In some embodiments, the contactless communication tag 10 can include, e.g., an adhesive layer 13 on a surface of the contactless communication tag 10. The adhesive layer 13 facilitates attached the contactless communication tag 10 to a surface of the document 11. The adhesive layer 13 may include, e.g., a heat activated adhesive, a moisture activated adhesive, a press-sensitive tape, a glue, resin or epoxy, or other adhesive substance.

In some embodiments, the contactless communication tag 10 includes components for storing and communicating data without contact or a physical connection with an external device, such as, e.g., a mobile device, computer, laptop, point-of-sale payment device, or other external device. Contactless communication may be facilitated with an antenna 21 operating at a frequency suitable to convey document related data to nearby devices. For example, the antenna 21 may operate at a near-field communication (NFC) frequency. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

In some embodiments, the antenna 21 may be a passive tag that is energized by a received reader or interrogator signal, and emits an electromagnetic field in response to the received signal, such as a radio frequency signal. Accordingly, in some embodiments, the antenna 21 may include any suitable passive RFID tag. In some embodiments, the RFID tag may operate at 120-150 kHz unregulated band, 13.56 MHz on ISO/IEC 18000-3 air interface or at other frequency bands and at rates ranging from 106 kbit/s to 424 kbit/s or greater. The antenna 21 may have a communication range of between about 0 and about 1 meter in range.

In some embodiments, the contactless communication tag 10 pairs the antenna 21 with an integrated circuit 22 for storing and manipulating data, and for modulating and demodulating the frequency of signals emitted by the antenna 22. In some embodiments, the integrated circuit 22 may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processing device may include data-processing capacity provided by the microprocessor. In some embodiments, the microprocessor may include memory, processing, interface resources, controllers, and counters. In some embodiments, the microprocessor may also include one or more programs stored in memory.

In some embodiments, the integrated circuit 22 includes programming for tracking the document 11 status. To keep storage requirements low, the programming may be packaged into an applet, or other small application for performing the specific task of tracking the document status 11. Accordingly, the integrated circuit 22 may ingest the reader or interrogator signals, and return applet data in the form of an electromagnetic signal instruction to instruct the antenna 21 to emit an electromagnetic signal carrying the applet data. For example, the integrated circuit 22 may be configured to maintain document information in a data storage, such as, e.g., the document type, the document identifier, an associated account or user identifier or both, a value, among other data. The integrated circuit 21 may automatically encode the document information in response to the reader signal or interrogator signal into a modulated electromagnetic signal for the antenna 21 to emit. Thus, in response to being read or interrogated by a user device, the contactless communication tag 10 may automatically return document information for electronic tracking and verification.

Figure 3:
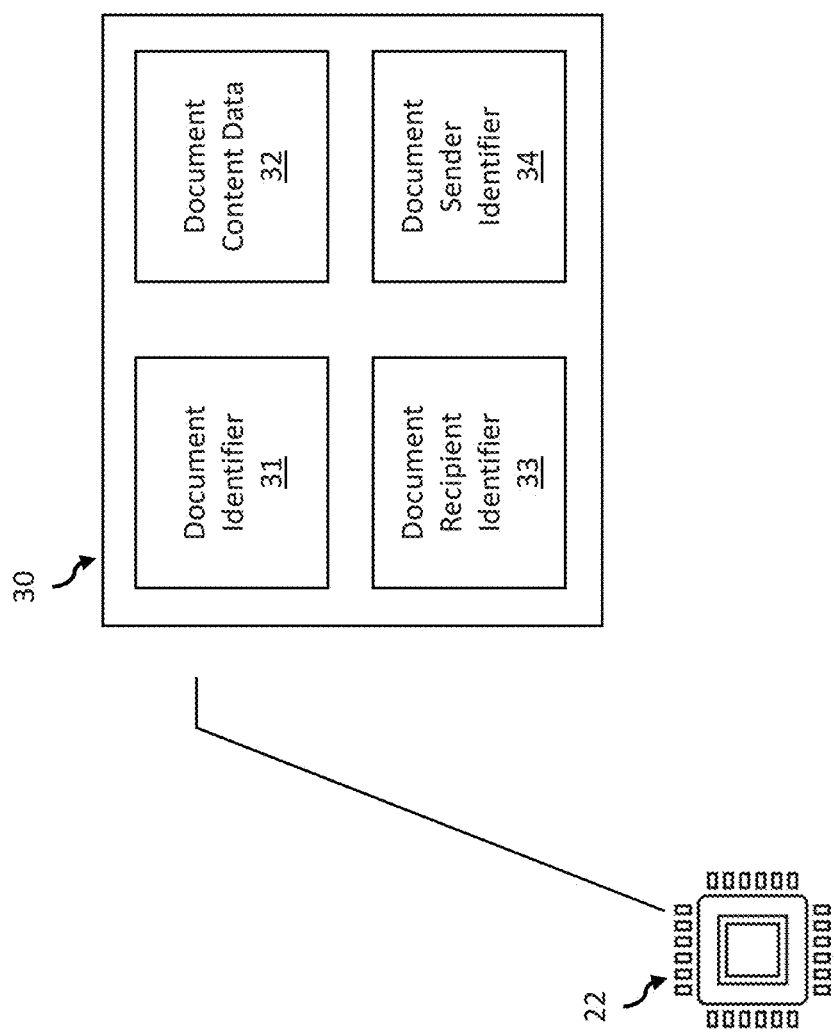

FIG. 3 is a block diagram of another exemplary storage system of a contactless tag for document verification and authentication in accordance with one or more embodiments of the present disclosure.

In some embodiments, the integrated circuit 22 of the contactless communication tag 10 may include an applet 30 for recording document information in a data storage. In some embodiments, the applet 30 has four components for recording document information, document identifier 31 component, a document content data 32 component, a document recipient identifier 33 component, and a document sender identifier 34 component. In some embodiments, the applet 30 may include fewer or greater components depending on the document being tracked and amount of detail being verified in the document. In some embodiments, the document is a personal check, however, the document may be, e.g., a travelers check, deed, contract, meeting minutes, or other document where chain or title, chain of custody and authenticity are important.

In some embodiments, the applet 30 may include a protected storage device for recording the document information via the components of the applet 30 by a verified or permission user. In some embodiments, the protected storage ensures that upon writing the document information, the data becomes read-only such that no later users or other persons may alter the information of each component. In some embodiments, the document information is coded into the applet 30 upon installation of the applet 30 onto the integrated circuit 22. Thus, in some embodiments, a reader or interrogator device interacting with the contactless communication tag 10 may load the applet 30 including the document information directly into the protected storage of the integrated circuit 22. By including the document information in the applet 30 code itself, the document information is more secure from alteration on subsequent access attempts.

However, in some embodiments, the applet 30 may be previously loaded onto the integrated circuit 22. Therefore, in some embodiments, a reader or interrogator device interacting with the contactless communication tag 10 may access the applet 30 and input the document information into the protected storage via the applet 30.

In some embodiments, upon subsequent communications by a reader or interrogator device, the applet 30 may be configured to return the document information recording in the applet components. Thus, the integrated circuit 22 may receive a request for the document information, e.g., via the antenna 21, and automatically perform the software instructions of the applet 30 to encode the document information from each applet component for contactless communication back to the reader or interrogator by the antenna 21.

In some embodiments, the applet 30 includes the document identifier 31 component. In some embodiments, the document identifier 31 may include, e.g., number, name, QR code, barcode, or other identifier of the document 11. For example, in some embodiments, the document 11 is a check. Thus, the document identifier 31 component records the check number as the document identifier 31. However, for other types of documents, the document identifier 31 may include a title of the document, serial number, or other identification. Therefore, upon an initial interaction with user device, an interrogator or reader may communicate the document identifier 31 as a component of the applet 30 to the integrated circuit 22. As a result, subsequent interactions with an interrogator or reader device may cause the integrated circuit 22 to encode the document identifier 31 from the applet 30 to communicate to the interrogator or reader device.

In some embodiments, the applet 30 includes the document content data 32 component. In some embodiments, the document content data 32 includes data representative of the information carried by the document 11. For example, for a personal check, the document content data 32 can include, e.g., the amount of money being transferred by the check, information or restrictions contained in a memo line of the check, among other contents of the personal check. However, for other documents, the document content data 32 may represent, e.g., terms of a contract, details of a deed or title, meeting minutes, or other information contained within a document. Therefore, upon an initial interaction with user device, an interrogator or reader may communicate the document content data 32 as a component of the applet 30 to the integrated circuit 22. As a result, subsequent interactions with an interrogator or reader device may cause the integrated circuit 22 to encode the document content data 32 from the applet 30 to communicate to the interrogator or reader device.

In some embodiments, the applet 30 includes the document recipient identifier 33 component. In some embodiments, the document recipient identifier 33 may represent a party to whom the document is being conveyed or transferred. For example, a personal check may include the document recipient identifier 33 including the name of the intended recipient of the check. However, for other documents, such as a title, contract, deed, or other document, the document recipient identifier 33 may refer to any recipient party of the document, as represented within the document or as the party to whom the document is being given (such as for memorabilia or other valuable document transfer). Therefore, upon an initial interaction with user device, an interrogator or reader may communicate the document recipient identifier 33 as a component of the applet 30 to the integrated circuit 22. As a result, subsequent interactions with an interrogator or reader device may cause the integrated circuit 22 to encode the document recipient identifier 33 from the applet 30 to communicate to the interrogator or reader device.

In some embodiments, the applet 30 includes the document sender identifier 34 component. In some embodiments, the document sender identifier 34 may represent a party from whom the document is being conveyed or transferred. For example, a personal check may include the document sender identifier 34 including the name of the writer of the check from whose account funds are to be drawn. However, for other documents, such as a title, contract, deed, or other document, the document sender identifier 34 may refer to any originating or controlling party of the document, as represented within the document or as the party to whom the document is being given (such as a possessor of a memorabilia item for transfer of memorabilia or other valuable document). Therefore, upon an initial interaction with user device, an interrogator or reader may communicate the document sender identifier 34 as a component of the applet 30 to the integrated circuit 22. As a result, subsequent interactions with an interrogator or reader device may cause the integrated circuit 22 to encode the document sender identifier 34 from the applet 30 to communicate to the interrogator or reader device.

Figure 4:
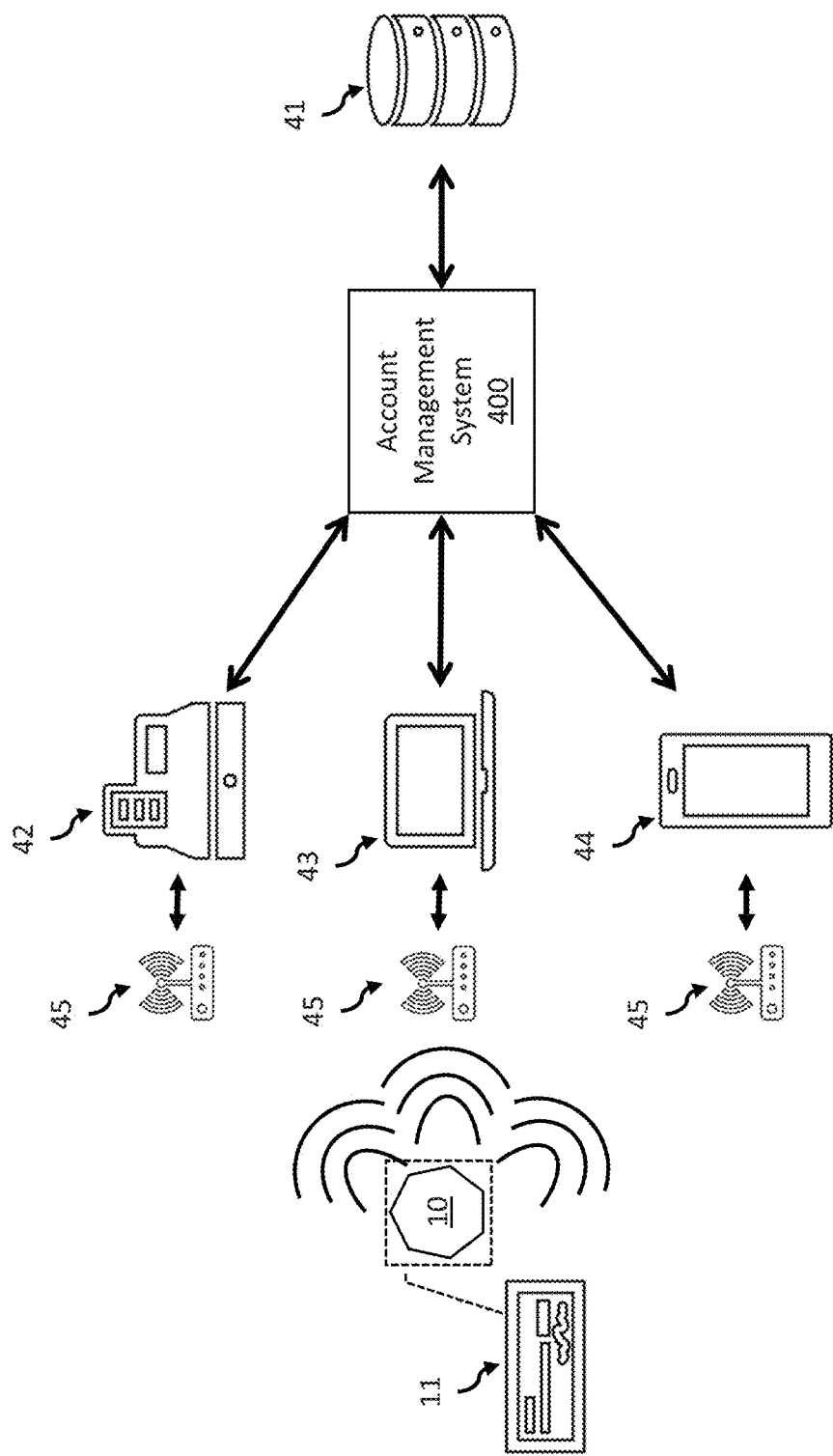

FIG. 4 is a block diagram of another exemplary computer-based system and platform for document verification and authentication using a contactless tag in accordance with one or more embodiments of the present disclosure.

In some embodiments, an account management system 400 may be in communication with multiple computing device and an account database 41. In some embodiments, the account database 41 includes user account associated with each user registered with the account management system 400. In some embodiments, the user accounts may include financial accounts, such as, e.g., checking accounts, savings accounts, credit accounts, investment accounts, loan or mortgage accounts, among other financial accounts. The account management system 400 may manage the balance of each user account as well as authorizing, executing, posting, or otherwise facilitating transactions associated with user account in the account database 41. In some embodiments, each change made to a user account may be managed and controlled by the account management system 400 and recorded in the account database 41. Thus, for each transaction associated with a user account, the account management system 400 may identify the user account recorded in the account database 41 and attribute the change to the user account, causing a change in the recorded balance. Each change resulting from each transaction may be recorded in the account database 41 to form a record for each account of transaction entries representing each transaction.

In some embodiments, the computing devices may be employed to initiate a transaction. Such computing devices may include, e.g., a mobile device 44, a user computing device 43, a point-of-sale device 42, or any other computing device for accessing the account management system 400 to view user accounts, manage user accounts, request transactions to user accounts, or other account related operations.

In some embodiments, such account related operations can include the use of a document 11 such as a promissory note, e.g., a check. Ordinarily, the promissory note 11 would only be manageable at the writing of the physical document 11 itself, and at the execution of a transfer authorized by the document 11 upon redemption by the recipient of the document 11. However, in some embodiments, the document 11 may be provided with the contactless communication tag 10 such that the computing devices may interact with the document 11 electronically to identify, verify, authenticate and track the document 11.

In some embodiments, the computing devices, including the mobile device 44, the user computer device 43, the point-of-sale device 42, or other computing device, may include an interrogator 45. In some embodiments, similar to the antenna 21 described above, the interrogator 45 may be configured to emit a short-range electromagnetic field using, e.g., RFID or NFC protocols to communicate data. However, different from the antenna 21, the interrogator 45 emits the electromagnetic field with sufficient power to cause the field to power the contactless communication tag 10 and return a reply signal to the interrogator 45.

In some embodiments, the interrogator 45 signal may include, e.g., a request to read data stored on the contactless communication tag 10, a request to write data to the contactless communication tag 10, a request to modify data on the contactless communication 10, or some other operation. However, in some embodiments, the contactless communication tag 10 is configured to ensure security and authenticity of the data stored thereon, including document data representing document 11 information. Therefore, in some embodiments, a user device, such as the user computing device 43 or the mobile device 44 may write applet data including the document data to the contactless communication tag 10 once, after which, the data is read-only.

In some embodiments, interactions between a computing device via the interrogator 45 and the contactless communication tag 10 can be used to request the document information or to add or modify the document information.

In some embodiments, an interaction via the interrogator 45 may be used to pair the contactless communication tag 10 to the document 11. To do so, the computing device associated with the interrogator 45 may instruct the interrogator 45 to emit a reader signal to communicate with a new, uninitialized contactless communication tag 10. Because the contactless communication tag 10 is uninitialized, the tag storage is blank. Thus, the contactless communication tag 10 may respond with, e.g., a tag identifier, but no accompanying data. The computing device may recognize that such a response indicates the uninitialized contactless communication tag 10 and may generate an interface for initializing the tag. For example, the computing device may open an application or a web page associated with loading document information onto uninitialized contactless communication tags 10.

In some embodiments, a user at the computing device may enter the document information into the interface, such as, e.g., the document identifier, the document contents, the recipient information such as a recipient identifier (e.g., name, user account number), the sender information as the sender identifier (e.g., name, user account number, etc.), account identifier associated with the document 11, date, among other data. In some embodiments, the interface may include user selectable elements, such as buttons, toggles, text input boxes, and other user input fields to accept the document information. In some embodiments, the interface may include an image capture tool that captures an image of the document 11 and automatically parses the document 11 and extracts the document information. In some embodiments, a combination of image input and user input may be employed.

Upon receiving the document information, the computing device may generate an applet to manipulate the document information as document data that is storable and processable by the integrated circuit 22 of the contactless communication tag 10. For example, the applet may include code to automatically cause responses to a set of permissioned requests including, e.g., a request to view the document information, a request to modify the document information by a permissioned entity (e.g., the sender, the recipient, a user associated with the account management system 400, or other permissioned user). The applet, including the document integrated therein, may be encoded by the computing device and communicated to the contactless communication tag 10 via another reader signal by the interrogator 45 carrying the applet data. Data may include an instruction to the integrated circuit 22 to store or install the applet and document data in a storage of the integrated circuit 22.

In some embodiments, subsequent interrogations of the contactless communication tag 10 may automatically cause the contactless communication tag 10 to return a tag signal carrying tag data including the applet stored in the integrated circuit 22. In some embodiments, by emitting a reader signal from an interrogator 45 of one or more of the computing devices, applet may return, via the antenna 21 of the contactless communication tag 10 tag data including the applet having document data representing the document information. In some embodiments, the applet may cause the computing device to initiate a document inquiry interface. In some embodiments, the applet may provide the document data to the document inquiry interface for viewing by the user. However, the document inquiry interface may disallow any modifications to the document data. Thus, subsequent interrogations of the contactless communication tag 10 may only view information, and not write information, thus ensuring the authenticity of the document data.

However, in some embodiments, the applet is loaded onto the contactless communication tag 10 include a link to a user account and to the document identifier associated with the document 11 rather than storing the document information directly. As a result, the information input into the tag initialization interface may be linked to the contactless communication tag 11 by adding a link to the user account and the document identifier (e.g., document number) to the applet, and then uploading the provided document information to the account management system 400 to link the document 11 to the user account via the document identifier. Thus, the applet provides a link between the user account and the document 11 using the user account identifier and the document identifier. As a result, subsequent interrogations return tag data including the applet output of the user account link and the document identifier such that the computing device communicates with the account management system 400 to access the document information in the associated user account in the account database 41.

In some embodiments, upon a recipient depositing or cashing the document 11 or otherwise taking possession of the document 11, the recipient may interrogate the contactless communication tag 10 via an interrogator 45. The interrogation may return the tag data and load the document inquiry interface. However, since the user is the recipient matching the recipient identifier, such as by providing the recipient account identifier or by accessing the document inquiry interface through an account specific portal of the recipient's account (e.g., via an application or webpage to which the recipient is already logged in to the recipient account), the recipient may instruct a modification to the document information including a status modification representing the receipt of the document.

In some embodiments, the account management system 400 may log modifications to the document information in the associated user accounts (e.g., the sender account or the recipient account or both). Thus, for each modification command via an account at a computing device, the account management system 400 may record the modification command, details thereof, and whether the modification was successful. Accordingly, the account management system 400 may record chain of title or chain of possession to validate and authenticate the document 11. The status may also or alternatively be maintained locally in the contactless communication tag 10 using associated commands via an interrogator 45.

Accordingly, the contactless communication tag 10 provides account-linked data tracking a status and information of the document 11 to which the contactless communication tag 10 has been affixed. The account management system 400 may use the user account information in the account database 41 to corroborate the information written on the document 11, whether by providing document information from the user account, or verifying that the document information in the contactless communication tag 10 matches user account data associated with the document 11.

Figure 5:
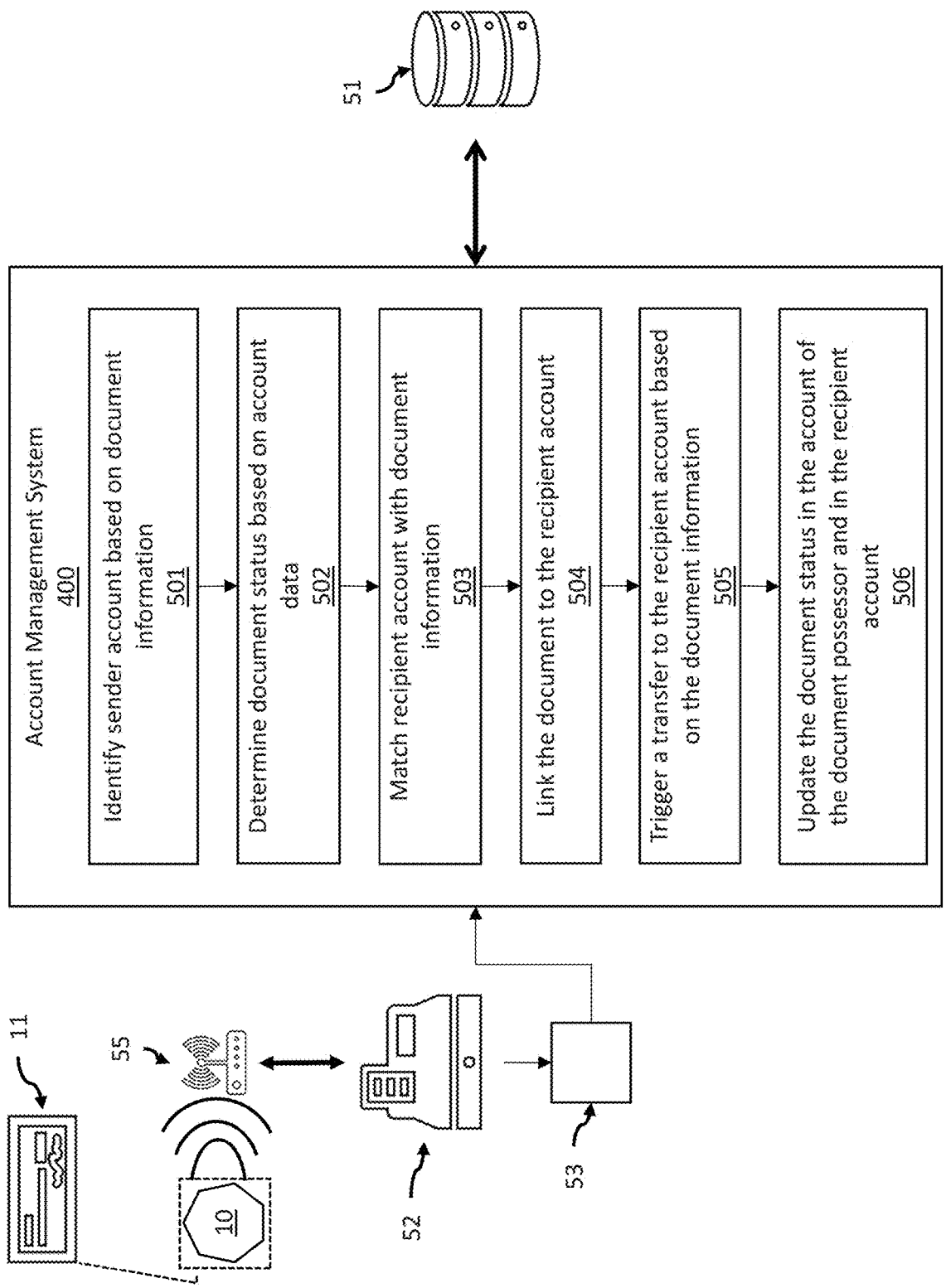

FIG. 5 is a block diagram of another exemplary computer-based system and platform for document receipt verification and authentication using a contactless tag in accordance with one or more embodiments of the present disclosure.

In some embodiments, upon the document 11 with the contactless communication tag 10 being brought into the vicinity of an interrogator 55, the electromagnetic field of the interrogator 55 may activate the contactless communication tag 10. In some embodiments, the interrogator 55 may be in communication with a device for initiating the deposit of checks, such as a teller computing device 52 for depositing checks (e.g., an automated teller device or manual teller device or other some other device for depositing checks). In some embodiments, as a result of the activation of the contactless communication tag 10, the contactless communication tag 10 emits a contactless radio signal carrying contactless radio signal tag including data stored on the contactless communication tag 10.

In some embodiments, the interrogator 55 may receive the contactless radio signal and communicate the contactless radio signal data carried therein to the teller computing device 52. In some embodiments, the teller computing device 52 may receive the contactless radio signal data and decode tag data encoded therein. In some embodiments, the tag data may include data related to the contactless communication tag 10 and the associated document 11. For example, the tag data may include a tag identifier and an applet link or identifier, or some other suitable applet reference.

In some embodiments, applet identifier, or other link or reference, includes data specific to the applet on contactless communication tag 10 such that the teller computing device 52 may generate or load a document tracking applet to communicate with an account management system for checking and updating the document 11 and document status. In some embodiments, the teller computing device 52 use the tag data to initiate a request, via the applet, for the data related to the document 11.

In some embodiments, the tag data may also include document information, such as, e.g., a document sender or possessor identifier, a document recipient identifier, document contents data, document identifier data, or other document data. In some embodiments, the tag data only include the document identifier data and/or the document sender or possessor data such that the teller computing device 52 may use the applet to pull the document sender or possessor identifier, document recipient identifier, document contents data, among other document data stored in user accounts in the account database 51, e.g., via the account management system.

In some embodiments, upon accessing the document data, the teller computing device 52 may process the document information 53 represented therein to effectuate a transfer between accounts based on the document 11 information. In some embodiments, the account management 400 may use the document information 53 to find, e.g., using search function, an associated user account with the document identifier at block 501. For example, the document identifier and/or the sender/possessor identifier may be linked to a user account associated with funds being transferred with the document 11. Thus, using the document sender identifier or the document identifier, the linked account in the account database 51 can be identified and accessed.

In some embodiments, access to the linked account in the account database 51 may be restricted to authorized users. For example, access may be restricted to, e.g., the sender, the recipient, and a representative of the institution associated with the account management system 400. Thus, the account management system 400 may authenticate the user at the teller computing device 52, via, e.g., an account log-in, a password entry upon the access request, two-factor authentication, or other user authentication mechanism. For example, the user at the teller computing device 52 may be logged into an application, portal, or website upon interrogation of the contactless communication tag. Thus, the applet may automatically use the authentication of the logged in user to authenticate access to the document information 53 and the user account in the account database 51 via the account management system 400.

In some embodiments, upon authentication of the user and identification of the sender account based on the document information 53, the account management system 400 may process the user account and match the document identifier to an entry therein. In some embodiments, the entry associated with the document identifier may include a record or log of the document status. In some embodiments, using the account data in the entry for the document identifier, the account management system may determine the status of the document 11. In some embodiments, the status can include, e.g., an authorized document, a signed document, a completed transaction based on a transfer of the document 11, among other status items. In some embodiments, each access, e.g., via the applet referenced by the contactless communication tag 55, may be recorded or logged in the document entry of the user account, along with status information such as, e.g., a time and date of the access, a location of the access, an identifier of the possessor accessing the entry, among other status data items. In some embodiments, the document status includes a validity of the document based on, e.g., how much time has passed since the document 11 was issued, whether the document 11 has been cancelled by the sender, whether the document 11 has already been transferred to the recipient, among other information. Accordingly, the document status may provide information for authenticating the validity of the document 11 such that the user may be warned if the document 11 is fraudulent, e.g., by not matching the document status or having expired or been cancelled, or other indication of fraud.

In some embodiments, where the document 11 is authenticated and valid, the account management system 400 may, at block 503, identify the recipient account using the recipient identifier of the document information. In some embodiments, similar to the determining the sender account in block 501, the account management system 400 may use the recipient identifier to search or otherwise identify the recipient account in the account database 51 to access recipient account data stored in the recipient account.

In some embodiments, the account management system 400 may use the recipient account to form a link to the document 11 that represents the transfer of the document to the recipient. However, in some embodiments, to ensure a valid transaction, the user at the teller computing device 52 may be restricted from creating the link unless the user is a permissioned user (e.g., according to the methods described above) for finalizing the transfer of the document 11. For example, the user may be authenticated as the recipient, the recipient's agent, or a representative associated with the account management system 400. If the user is authenticated for completing the transfer to their account, the link between the document 11 (e.g., using the document identifier) and the recipient account may be formed.

In some embodiments, the formation of the link may automatically trigger, at block 505, a transfer from the sender account to the recipient account of a quantity based on the document content data of the document information 53. For example, the account link may signal that the recipient has taken possession of the document 11 including a check or other promissory note, and automatically initiate a transfer request for the transfer of funds in the recipient account.

In some embodiments, the transfer request may be validated by comparing the document information 53 decoded from the tag data including the document content data. For example, the document content data may include, e.g., a value to be transferred, a date, a memo-line item, among other content information. The document content data may be compared to information in the user account or document status log to verify that the document content data of the contactless communication tag 10 matches the originally entered information for the document 11.

In some embodiments, upon validation of the transfer request, the account management system 400 may update, at block 506, the document status in the entry for the document in the sender's account to reflect the transfer of the contents of the document 11. The account management system 400 store the updated log in the sender's account in the account database 51 to ensure that the record is stored.

Figure 6:
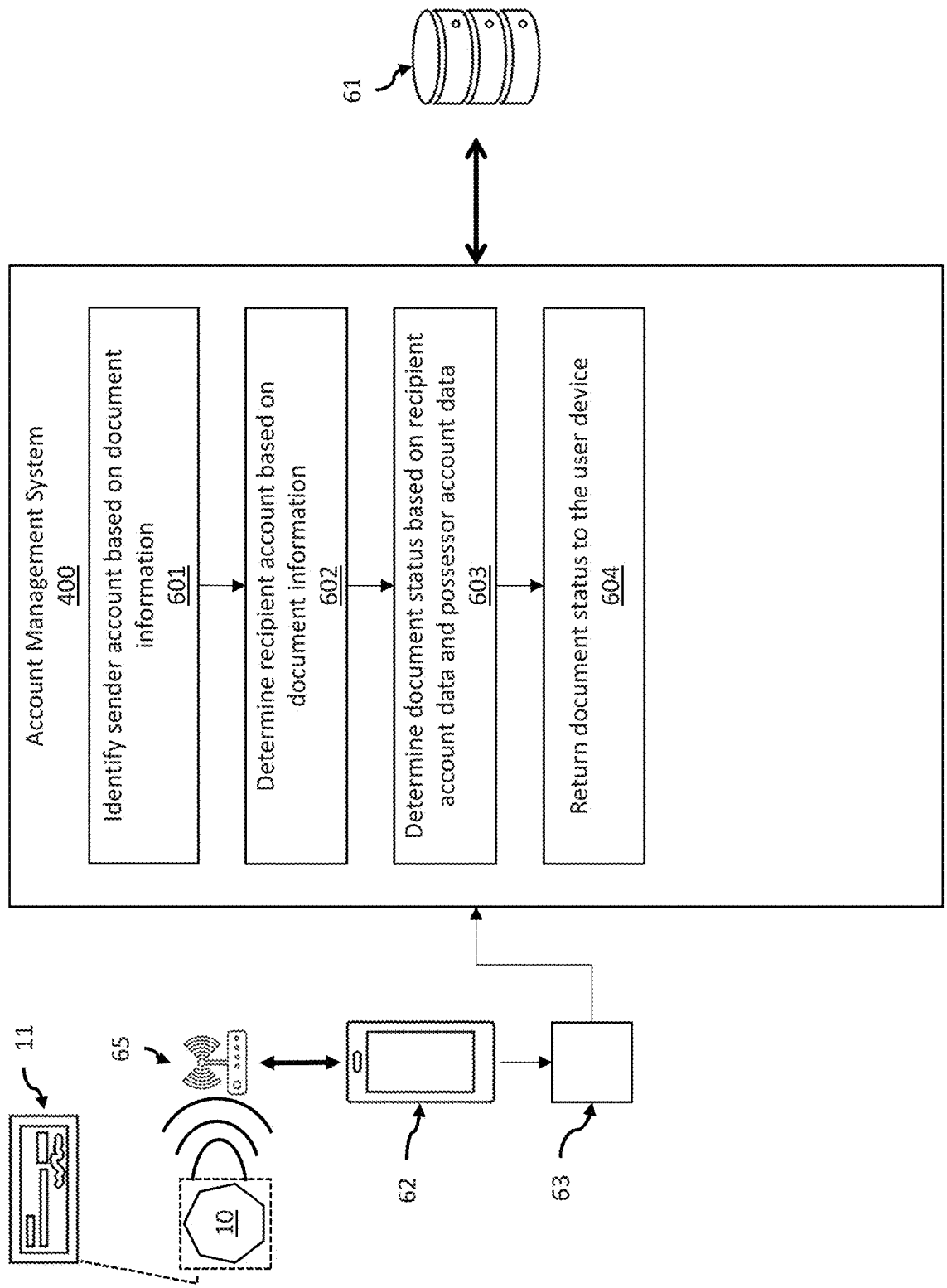

FIG. 6 is a block diagram of another exemplary computer-based system and platform for document status verification and authentication using a contactless tag in accordance with one or more embodiments of the present disclosure.

In some embodiments, upon the document 11 with the contactless communication tag 10 being brought into the vicinity of an interrogator 65, the electromagnetic field of the interrogator 65 may activate the contactless communication tag 10. In some embodiments, the interrogator 65 may be in communication with a device for accessing account data including personal check statuses and transactions, such as a user device 62 or other suitable computing device. In some embodiments, as a result of the activation of the contactless communication tag 10, the contactless communication tag 10 emits a contactless radio signal carrying contactless radio signal tag including data stored on the contactless communication tag 10.

In some embodiments, the interrogator 65 may receive the contactless radio signal and communicate the contactless radio signal data carried therein to the user device 62. In some embodiments, the user device 62 may receive the contactless radio signal data and decode tag data encoded therein. In some embodiments, the tag data may include data related to the contactless communication tag 10 and the associated document 11. For example, the tag data may include a tag identifier and an applet link or identifier, or some other suitable applet reference.

In some embodiments, applet identifier, or other link or reference, includes data specific to the applet on contactless communication tag 10 such that the user device 62 may generate or load a document tracking applet to communicate with an account management system for checking and updating the document 11 and document status. In some embodiments, the user device 62 use the tag data to initiate a request, via the applet, for the data related to the document 11.

In some embodiments, the tag data may also include document information, such as, e.g., a document sender or possessor identifier, a document recipient identifier, document contents data, document identifier data, or other document data. In some embodiments, the tag data only include the document identifier data and/or the document sender or possessor data such that the user device 62 may pull the document sender or possessor identifier, document recipient identifier, document contents data, among other document data from the account management system via the applet.

In some embodiments, upon accessing the document data, the user device 62 may process the document information 63 represented therein to determine the status of a transfer between accounts associated with the document information 63. In some embodiments, the account management 400 may use the document information 63 to find, e.g., using search function, an associated user account with the document identifier at block 601. For example, the document identifier and/or the sender/possessor identifier may be linked to a user account associated with funds being transferred with the document 11. Thus, using the document sender identifier or the document identifier, the linked account in the account database 61 can be identified and accessed.

In some embodiments, access to the linked account in the account database 61 may be restricted to authorized users. For example, access may be restricted to, e.g., the sender, the recipient, and a representative of the institution associated with the account management system 400. Thus, the account management system 400 may authenticate the user at the user device 62, via, e.g., an account log-in, a password entry upon the access request, two-factor authentication, or other user authentication mechanism. For example, the user at the user device 62 may be logged into an application, portal, or website upon interrogation of the contactless communication tag. Thus, the applet may automatically use the authentication of the logged in user to authenticate access to the document information 63 and the user account in the account database 61 via the account management system 400.

In some embodiments, similarly, the account management system 400 may, at block 603, identify the recipient account using the recipient identifier of the document information. In some embodiments, similar to the determining the sender account in block 601, the account management system 400 may use the recipient identifier to search or otherwise identify the recipient account in the account database 61 to access recipient account data stored in the recipient account.

In some embodiments, upon authentication of the user and identification of the sender account or recipient account, or both, the account management system 400 may, at block 603, process the user account and recipient account and match the document identifier to an entry therein. In some embodiments, the entry associated with the document identifier may include a record or log of the document status. In some embodiments, using the account data in the entry for the document identifier, the account management system may determine the status of the document 11. In some embodiments, the status can include, e.g., an authorized document, a signed document, a completed transaction based on a transfer of the document 11, among other status items. In some embodiments, each access, e.g., via the applet referenced by the contactless communication tag 65, may be recorded or logged in the document entry of the user account, along with status information such as, e.g., a time and date of the access, a location of the access, an identifier of the possessor accessing the entry, among other status data items. In some embodiments, the document status includes a validity of the document based on, e.g., how much time has passed since the document 11 was issued, whether the document 11 has been cancelled by the sender, whether the document 11 has already been transferred to the recipient, among other information. Accordingly, the document status may provide information for authenticating the validity of the document 11 such that the user may be warned if the document 11 is fraudulent, e.g., by not matching the document status or having expired or been cancelled, or other indication of fraud.

In some embodiments, the account management system 604 may return, at block 604, the document status to the user device 62. In some embodiments, the document status may then be displayed, e.g., via the applet, on a display of the user device 62. As a result, the user may view the document status and determine whether the document 11 is authentic and valid based on whether the returned status, the document information 63 and the document 11 itself match. Thus, a user may verify a document 11 as authentic and valid using the contactless communication tag 10.

Figure 7:
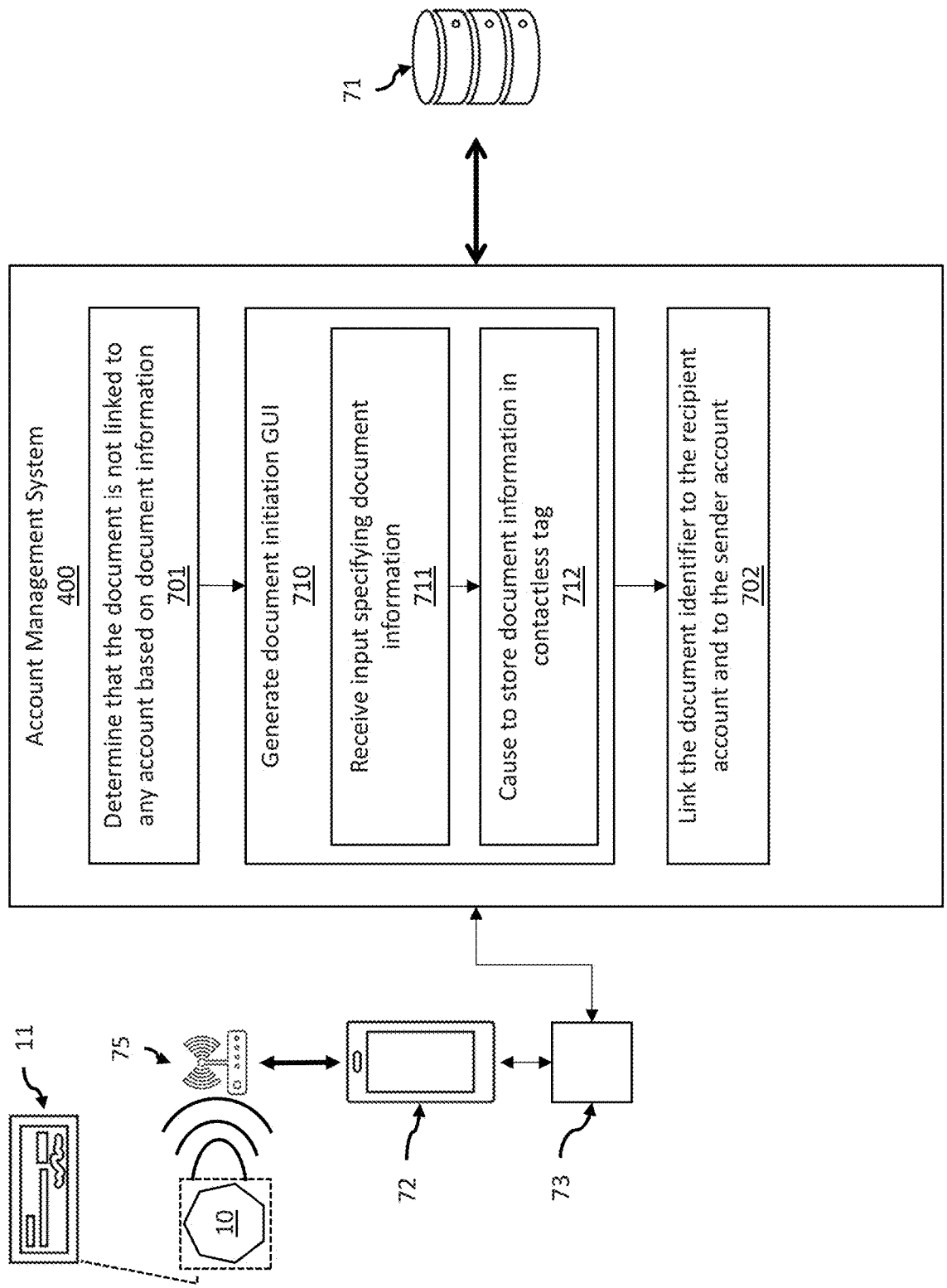

FIG. 7 is a block diagram of another exemplary computer-based system and platform for document creation verification and authentication using a contactless tag in accordance with one or more embodiments of the present disclosure.

In some embodiments, upon the document 11 with the contactless communication tag 10 being brought into the vicinity of an interrogator 75, the electromagnetic field of the interrogator 75 may activate the contactless communication tag 10. In some embodiments, the interrogator 75 may be in communication with a device for accessing account data including personal check statuses and transactions, such as a user device 72 or other suitable computing device. In some embodiments, as a result of the activation of the contactless communication tag 10, the contactless communication tag 10 emits a contactless radio signal carrying contactless radio signal tag including data stored on the contactless communication tag 10.

In some embodiments, the interrogator 75 may receive the contactless radio signal and communicate the contactless radio signal data carried therein to the user device 72. In some embodiments, the user device 72 may receive the contactless radio signal data and decode tag data encoded therein. In some embodiments, the tag data may include data related to the contactless communication tag 10 and the associated document 11. For example, the tag data may include a tag identifier and an applet link or identifier, or some other suitable applet reference.

In some embodiments, applet identifier, or other link or reference, includes data specific to the applet on contactless communication tag 10 such that the user device 72 may generate or load a document tracking applet to communicate with an account management system for checking and updating the document 11 and document status. In some embodiments, the user device 72 use the tag data to initiate a request, via the applet, for the data related to the document 11.

In some embodiments, the tag data may also include document information 63, such as, e.g., a document sender or possessor identifier, a document recipient identifier, document contents data, document identifier data, or other document data. In some embodiments, the tag data only include the document identifier data and/or the document sender or possessor data such that the user device 72 may pull the document sender or possessor identifier, document recipient identifier, document contents data, among other document data from the account management system 400 via the applet.

In some embodiments, upon receiving the document information 63 and initiating the applet, the user device 72 may access the account management system 400 to determine the status and initiate the document 11 in one or more user accounts. In some embodiments, where the document 11 is a new document that has not yet been initiated in a user account, the account management system 400 may being the process to link the document 11 and associated information 73 to one or more user accounts of users associated with the document 11.

In some embodiments, the document information 73 for a new, blank document 11 may include the tag identifier but have a blank sender identifier, recipient identifier, and document content data, or link to blank sender identifier, recipient identifier, and document content data. Thus, based on the blank document information 73, the account management system 400 may determine, at block 701, that the document is not linked to any account, and thus not yet initiated.

In some embodiments, in response to the unlinked document 11, the account management system 400 may, at block 710 generate a document initiation graphical user interface (GUI) to allow a user the user device 72 to input, via the applet, document information 73. Accordingly, the document initiation GUI may include user interface elements, such as, e.g., application or website user input mechanisms (e.g., buttons, text input fields, selection fields, etc.). The applet may receive a command form the account management system 400 to generate the document initiation GUI, causing the document initiation GUI with associated input mechanism to be displayed on the user device 72.

In some embodiments, upon the user inputting document information 73 into the document initiation GUI, the applet may communicate the document information 73 to the account management system 400, which, at block 711, receives the document information 73. In some embodiments, upon receiving and item of document information 73, the account management system 400 may generate a document status entry that includes the document information 73, including, e.g., sender identifier, recipient identifier, document content data, date data, document identifier, and any other related information specified by the user. In some embodiments, the account management system 400 may cause, via the applet, the user device 72 to write the document information 63 to the contactless communication tag 10 and store the document information 73 thereon. However, in some embodiments, the account management system 400 may, instead or in addition, store the document information 73 in the account database.

In some embodiments, the account management system 400 may identify, based on the document information 73 and the provided sender identifier and recipient identifier, the sender account and recipient account associated with the document 11. In some embodiments, to make the document information 73 and status available to sender and recipient, the account management system 400 may, at block 702, generate an account link between the document identifier and the user account and recipient account, thus linking the document information 73 and status to the sender and recipient accounts in the account database 71. Thus, both sender and recipient, upon authentication via the account management system 400, may access the document status entry to view the status of the document 11 and assess validity, status and authenticity.

Figure 8:
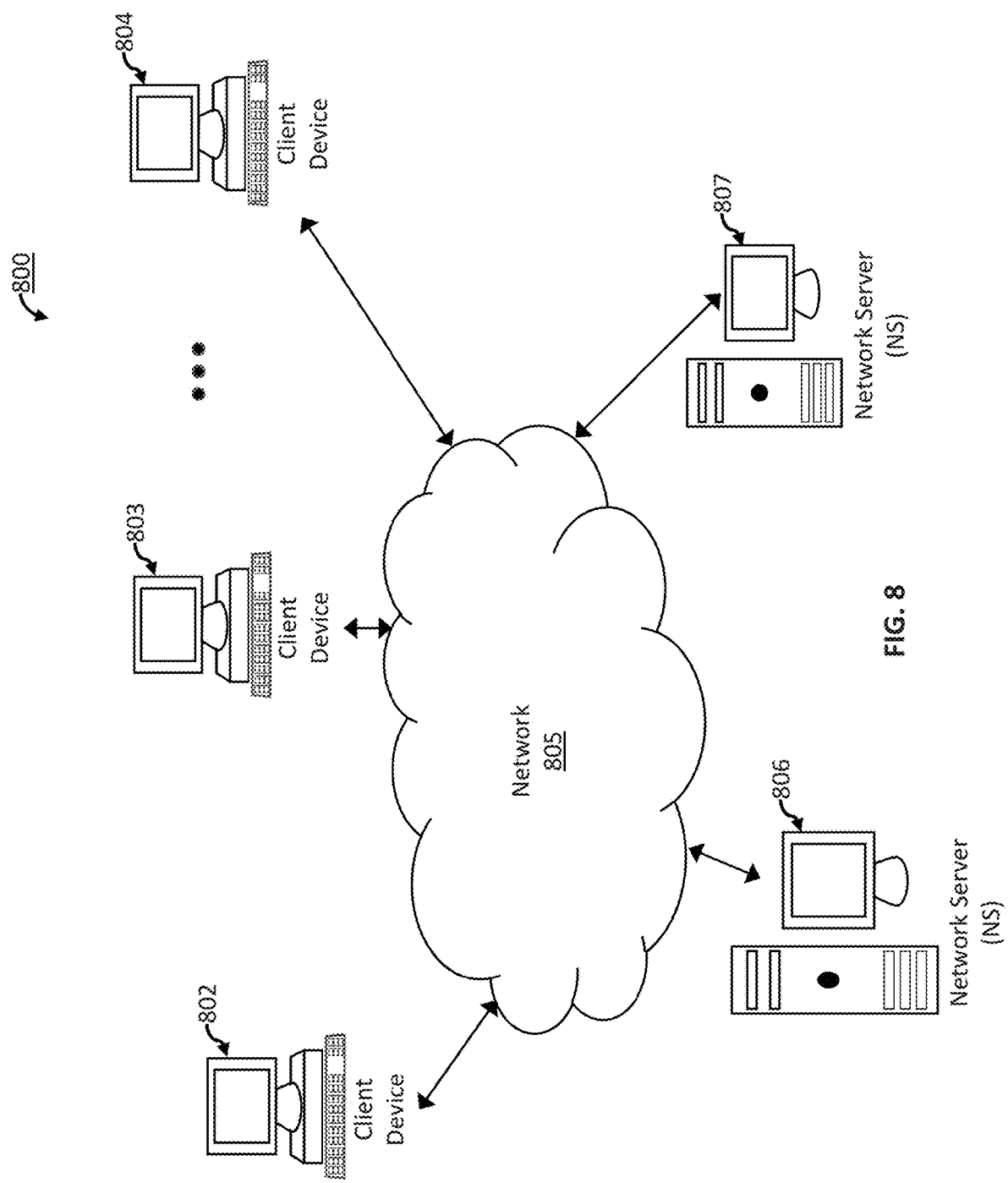

FIG. 8 depicts a block diagram of an exemplary computer-based system and platform 800 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 800 may be configured to manage a large number of members and concurrent transactions, as detailed herein. In some embodiments, the exemplary computer-based system and platform 800 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 8, members 802-804 (e.g., clients) of the exemplary computer-based system and platform 800 may include virtually any computing device capable of receiving and sending a message over a network (e.g., cloud network), such as network 805, to and from another computing device, such as servers 806 and 807, each other, and the like. In some embodiments, the member devices 802-804 may be personal computers, multiprocessor systems, microprocessor-based or programmable consumer electronics, network PCs, and the like. In some embodiments, one or more member devices within member devices 802-804 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 802-804 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 802-804 may include may run one or more applications, such as Internet browsers, mobile applications, voice calls, video games, videoconferencing, and email, among others. In some embodiments, one or more member devices within member devices 802-804 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 802-804 may be specifically programmed by either Java, .Net, QT, C, C++ and/or other suitable programming language. In some embodiments, one or more member devices within member devices 802-804 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 805 may provide network access, data transport and/or other services to any computing device coupled to it. In some embodiments, the exemplary network 805 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 805 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 805 may include and implement, as an alternative or in conjunction with one or more of the above, a WiMAX architecture defined by the WiMAX forum. In some embodiments and, optionally, in combination of any embodiment described above or below, the exemplary network 805 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 805 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 805 may also include mass storage, such as network attached storage (NAS), a storage area network (SAN), a content delivery network (CDN) or other forms of computer or machine-readable media.

In some embodiments, the exemplary server 806 or the exemplary server 807 may be a web server (or a series of servers) running a network operating system, examples of which may include but are not limited to Microsoft Windows Server, Novell NetWare, or Linux. In some embodiments, the exemplary server 806 or the exemplary server 807 may be used for and/or provide cloud and/or network computing. Although not shown in FIG. 8, in some embodiments, the exemplary server 806 or the exemplary server 807 may have connections to external systems like email, SMS messaging, text messaging, ad content providers, etc. Any of the features of the exemplary server 806 may be also implemented in the exemplary server 807 and vice versa.

In some embodiments, one or more of the exemplary servers 806 and 807 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 801-804.

In some embodiments and, optionally, in combination of any embodiment described above or below, for example, one or more exemplary computing member devices 802-804, the exemplary server 806, and/or the exemplary server 807 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 9:
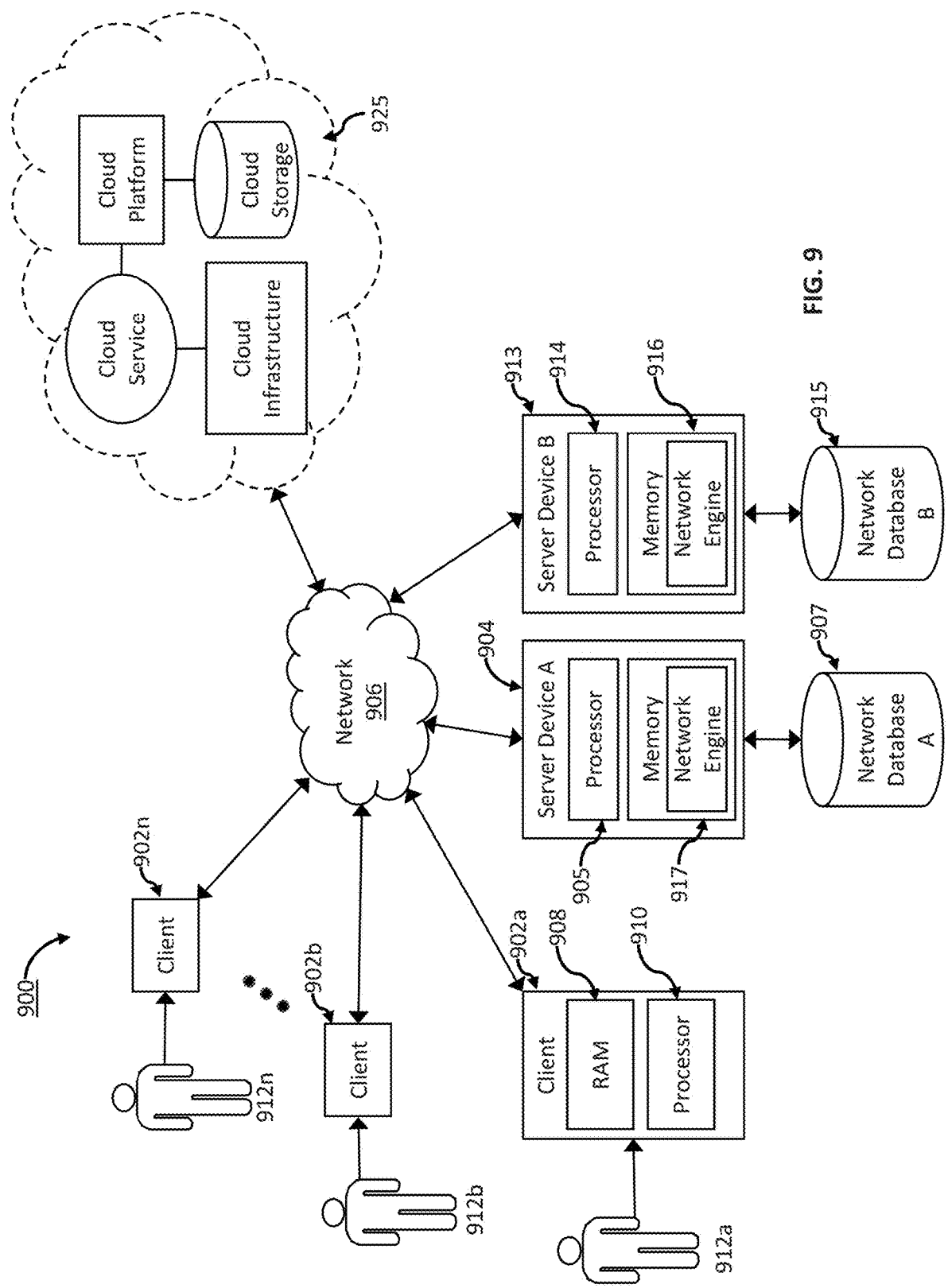

FIG. 9 depicts a block diagram of another exemplary computer-based system and platform 900 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 902a, 902b thru 902n shown each at least includes a computer-readable medium, such as a random-access memory (RAM) 908 coupled to a processor 910 or FLASH memory. In some embodiments, the processor 910 may execute computer-executable program instructions stored in memory 908. In some embodiments, the processor 910 may include a microprocessor, an ASIC, and/or a state machine. In some embodiments, the processor 910 may include, or may be in communication with, media, for example computer-readable media, which stores instructions that, when executed by the processor 910, may cause the processor 910 to perform one or more steps described herein. In some embodiments, examples of computer-readable media may include, but are not limited to, an electronic, optical, magnetic, or other storage or transmission device capable of providing a processor, such as the processor 910 of client 902a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 902a through 902n may also comprise a number of external or internal devices such as a mouse, a CD-ROM, DVD, a physical or virtual keyboard, a display, or other input or output devices. In some embodiments, examples of member computing devices 902a through 902n (e.g., clients) may be any type of processor-based platforms that are connected to a network 906 such as, without limitation, personal computers, digital assistants, personal digital assistants, smart phones, pagers, digital tablets, laptop computers, Internet appliances, and other processor-based devices. In some embodiments, member computing devices 902a through 902n may be specifically programmed with one or more application programs in accordance with one or more principles/methodologies detailed herein. In some embodiments, member computing devices 902a through 902n may operate on any operating system capable of supporting a browser or browser-enabled application, such as Microsoft™, Windows™, and/or Linux. In some embodiments, member computing devices 902a through 902n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 902a through 902n, users, 912a through 902n, may communicate over the exemplary network 906 with each other and/or with other systems and/or devices coupled to the network 906. As shown in FIG. 9, exemplary server devices 904 and 913 may be also coupled to the network 906. In some embodiments, one or more-member computing devices 902a through 902n may be mobile clients.

In some embodiments, at least one database of exemplary databases 907 and 915 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 10:
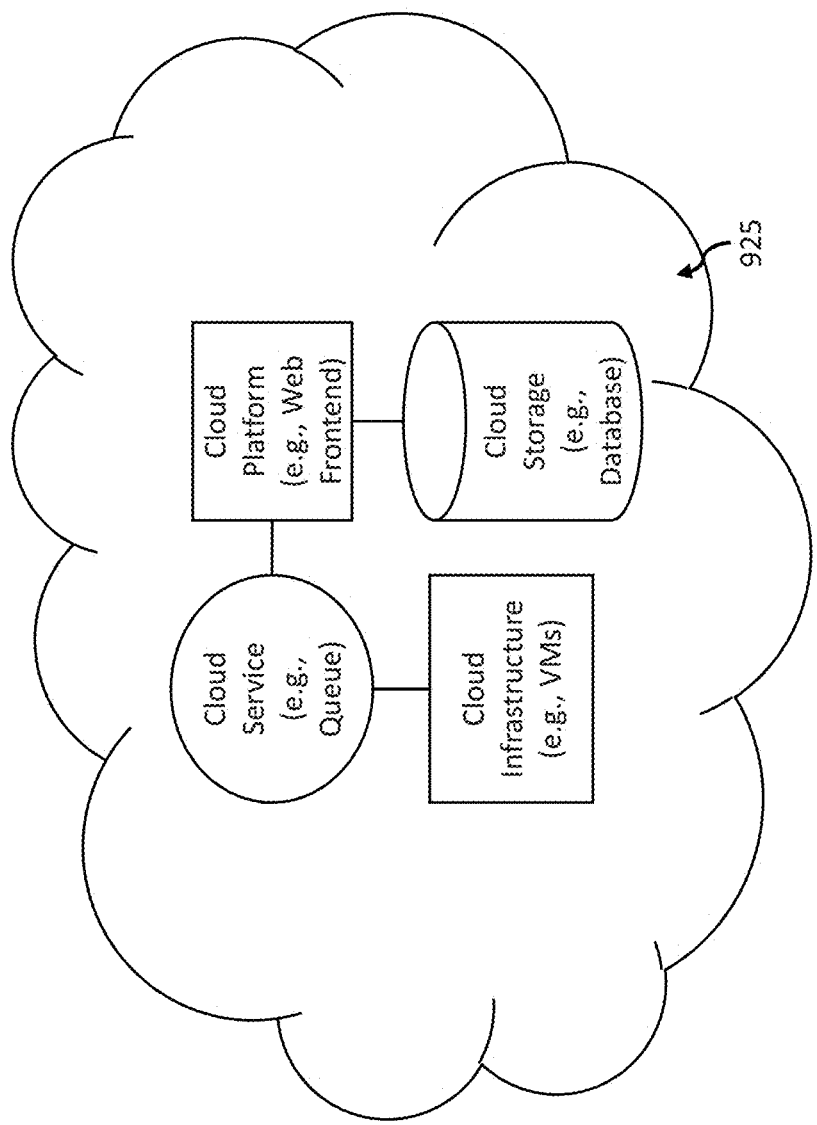
Figure 11:
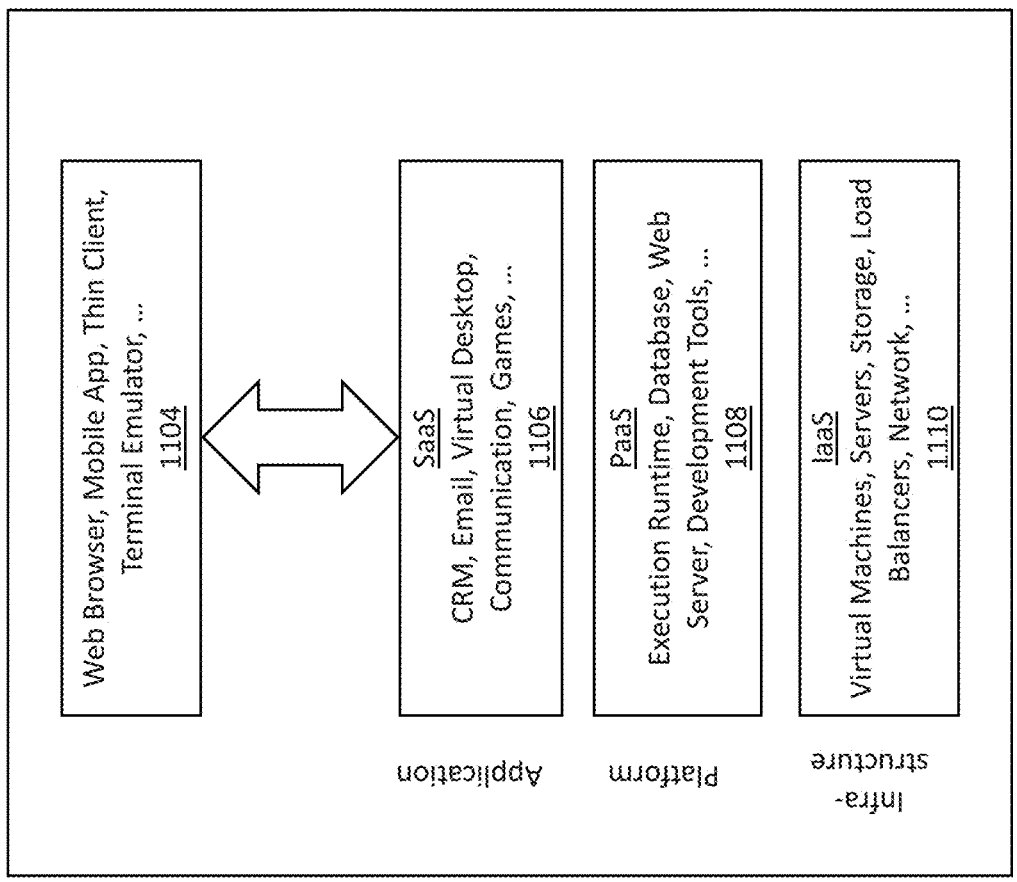

In some embodiments, the exemplary inventive computer-based systems/platforms, the exemplary inventive computer-based devices, and/or the exemplary inventive computer-based components of the present disclosure may be specifically configured to operate in a cloud computing/architecture 925 such as, but not limiting to: infrastructure a service (IaaS) 1110, platform as a service (PaaS) 1108, and/or software as a service (SaaS) 1106 using a web browser, mobile app, thin client, terminal emulator or other endpoint 1104. FIGS. 10 and 11 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) Linux, (2) Microsoft Windows, (3) OS X (Mac OS), (4) Solaris, (5) UNIX (6)

VMWare, (7) Android, (8) Java Platforms, (9) Open Web Platform, (10) Kubernetes or other suitable computer platforms. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app, etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

The aforementioned examples are, of course, illustrative and not restrictive.

At least some aspects of the present disclosure will now be described with reference to the following numbered clauses.

1. A method comprising:
   receiving, by at least one processor of at least one computing device via an antenna module from a contactless reader of the at least one computing device, a contactless radio signal data, comprising encoded tag data associated with a contactless communication tag;
wherein the tag data comprises a tag identifier and an applet identifier;
executing, by the at least one processor, an applet associated with the contactless communication tag based on the tag data;
receiving, by the at least one processor, document data associated with an applet-linked document;
wherein the document data comprises:
a document identifier,
a document content data,
a document recipient identifier indicating a document recipient, and
a document sender identifier indicating a document sender;
generating, by the at least one processor, an account link linking the document data to a user account associated with the document sender;
generating, by the at least one processor, a document entry in the user account based on the account link, wherein the document entry comprises the document content data;
generating, by the at least one processor, a webpage from the applet to record the document data such that the document data is accessible upon subsequent reception of the contactless radio signal data; and
causing to display, by the at least one processor, the document data and a current status of the applet-linked document on a display of the at least one computing device associated with the contactless reader.

2. The method of clause 1, further comprising:
determining, by the at least one processor, a user authentication for an application in communication with the contactless reader; and
decoding, by the at least one processor, the tag data in the application.

3. The method of clause 2, further comprising:
generating, by the at least one processor, the applet within the application using the user authentication; and
generating, by the at least one processor, the account link based on the user authentication.

4. The method of clause 1, further comprising:
receiving, by the at least one processor, an authentication request associated with the user account to access the webpage;
determining, by the at least one processor, an authentication of the user account linked to the document data via the account link; and
causing to display, by the at least one processor, the document data and a current status of the applet-linked document via the webpage.

5. The method of clause 1, wherein the applet-linked document is a promissory document and wherein the applet is a promissory applet.

6. The method of clause 5, wherein the document comprises a check.

7. The method of clause 1, wherein the contactless communication tag comprises a near field communication (NFC) chip.

8. The method of clause 1, wherein the contactless communication tag comprises a radio frequency identification (RFID) chip.

9. The method of clause 1, wherein the contactless reader comprises a smartphone.

10. The method of clause 1, further comprising updating, by the at least one processor, the user account with the current status of the document data.

11. The method of clause 1, further comprising:
receiving, by the at least one processor, a transfer request associated with the document identifier to transfer a quantity from the user account;
determining, by the at least one processor, a valid transfer request associated with the transfer request based on a comparison of the quantity associated with the transfer request and the document content data; and
transferring, by the at least one processor, the quantity from the user account based on the valid transfer request.

12. A method comprising:
receiving, by at least one processor of at least one computing device via an antenna module from a contactless reader of the at least one computing device, a contactless radio signal, comprising encoded tag data associated with a contactless communication tag from a contactless reader associated with a document possessor;
wherein the tag data comprises a tag identifier and a promissory applet identifier;
executing, by the at least one processor, an applet associated with the contactless communication tag based on the tag data;
receiving, by the at least one processor, a webpage conveying document data associated with an applet-linked document based on the applet;
wherein the document data comprises:
a document identifier,
document content data,
a document recipient identifier indicating a document recipient, and
a document sender identifier indicating a document sender;
matching, by the at least one processor, the document recipient with the document possessor based on the document recipient identifier;
generating, by the at least one processor, an account link linking the document data to a user account associated with the document possessor where the document possessor matches the document recipient;
generating, by the at least one processor, a document entry in the user account based on the account link, wherein the document entry comprises the document content data;
transferring, by the at least one processor, a quantity from a sender account linked to the document sender identifier to the user account based on the document content data;
updating, by the at least one processor, a current status of the applet-linked document to indicate the transfer of the quantity; and
updating, by the at least one processor, the webpage to indicate the current status of the applet-linked document.

13. The method of clause 12, further comprising:
determining, by the at least one processor, a user authentication for an application in communication with the contactless reader; and
decoding, by the at least one processor, the tag data in the application.

14. The method of clause 13, further comprising:
generating, by the at least one processor, the applet within the application using the user authentication; and generating, by the at least one processor, the account link based on the user authentication.

15. The method of clause 12, further comprising:
    receiving, by the at least one processor, an authentication request associated with the user account to access the webpage;
    determining, by the at least one processor, an authentication of the user account linked to the document data via the account link; and
    causing to display, by the at least one processor, the document data and a current status of the applet-linked document via the webpage.

16. The method of clause 12, wherein the document comprises a check.

17. The method of clause 12, wherein the contactless communication tag comprises a near field communication (NFC) chip.

18. The method of clause 12, wherein the contactless reader comprises a smartphone.

19. The method of clause 12, further comprising:
    receiving, by the at least one processor, a transfer request to transfer the quantity from the sender account;
    determining, by the at least one processor, a valid transfer request associated with the transfer request based on a comparison of the quantity associated with the transfer request and the document content data; and
    transferring, by the at least one processor, the quantity from the sender account based on the valid transfer request.

20. A system comprising:
    at least one processor of at least one computing device via an antenna module from a contactless reader of the at least one computing device; and
    wherein the at least one processor is configured to implement instructions causing the at least one processor to perform steps to:
        receive a contactless radio signal data, comprising encoded tag data associated with a contactless communication tag;
            wherein the tag data comprises a tag identifier and an applet identifier;
        execute an applet associated with the contactless communication tag based on the tag data;
        receive document data associated with an applet-linked document;
            wherein the document data comprises:
                a document identifier,
                a document content data,
                a document recipient identifier indicating a document recipient, and
                a document sender identifier indicating a document sender;
        generate an account link linking the document data to a user account associated with the document sender;
        generate a document entry in the user account based on the account link, wherein the document entry comprises the document content data;
        generate a webpage from the applet to record the document data such that the document data is accessible upon subsequent reception of the contactless radio signal data; and
        cause to display the document data and a current status of the applet-linked document on a display of the at least one computing device associated with the contactless reader.

While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

The invention claimed is:
1. A method comprising:
   obtaining a contactless communication tag configured to emit a contactless radio signal in response to a reader signal from at least one computing device;
   attaching the contactless communication tag to an applet-linked document;
      wherein the applet-linked document comprises document fields comprising:
         a document identifier that identifies the applet-linked document,
         a document content,
         a document recipient, and
         a document sender;
   receiving, by at least one processor from at least one computing device, tag data associated with the contactless communication tag;
      wherein the tag data is extracted from a contactless radio signal emitted by the contactless communication tag in response to a reader signal of the at least one computing device;
      wherein the tag data comprises a tag identifier and an applet identifier;
   instructing, dynamically and in real-time, by the at least one processor, the at least one computing device to execute, based on the tag data, an applet associated with the contactless communication tag to:
      receive, in real-time by user input via the at least one computing device, the document fields of the applet-linked document;
      generate, in real-time, document content data associated with the applet-linked document;
         wherein the document content data comprises:
            a document identifier data item representing the document identifier,
            a document content data item representing the document content,
            a document recipient data item representing the document recipient, and
            a document sender data item representing the document sender;
      write, in real-time, the document content data to a memory of the contactless communication tag so as to enable a subsequent contactless radio signal to carry subsequent tag data comprising the document content data;
   generating, dynamically and in real-time, by the at least one processor, an account link that links the tag identifier to a user account associated with the at least one computing device;
   generating, dynamically and in real-time, by the at least one processor, a document entry in the user account for the applet-linked document based on the account link between the tag identifier and the user account, wherein the document entry stores the document content data;

receiving, by the at least one processor, a transfer request comprising the tag identifier and a requested document content data item representing a quantity to transfer from the user account;
accessing, by the at least one processor via the account link, the document content data associated with the contactless communication tag of the applet-linked document based at least in part on the tag identifier;
determining, by the at least one processor, a valid transfer request associated with the transfer request based on a comparison of the requested document content data item and the document content data; and
transferring, by the at least one processor, the quantity from the user account based on the valid transfer request.

2. The method of claim 1, further comprising:
determining, by the at least one processor, a user authentication for an application in communication with the contactless reader; and
decoding, by the at least one processor, the tag data in the application.

3. The method of claim 2, further comprising:
generating, by the at least one processor, the applet within the application using the user authentication; and
generating, by the at least one processor, the account link based on the user authentication.

4. The method of claim 1, further comprising:
receiving, by the at least one processor, an authentication request associated with the user account to access the webpage;
determining, by the at least one processor, an authentication of the user account linked to the document data via the account link; and
causing to display, by the at least one processor, the document data and a current status of the applet-linked document via the webpage.

5. The method of claim 1, wherein the applet-linked document is a promissory document and wherein the applet is a promissory applet.

6. The method of claim 5, wherein the document comprises a check.

7. The method of claim 1, wherein the contactless communication tag comprises a near field communication (NFC) chip.

8. The method of claim 1, wherein the contactless communication tag comprises a radio frequency identification (RFID) chip.

9. The method of claim 1, wherein the contactless reader comprises a smartphone.

10. The method of claim 1, further comprising updating, by the at least one processor, the user account with the current status of the document data.

11. A method comprising:
obtaining a contactless communication tag configured to emit a contactless radio signal in response to a reader signal from at least one computing device;
attaching the contactless communication tag to an applet-linked document;
wherein the applet-linked document comprises document fields comprising:
a document identifier that identifies the applet-linked document,
a document content,
a document recipient, and
a document sender;
receiving, by at least one processor from at least one computing device comprising a contactless reader associated with a document possessor, a contactless radio signal, tag data associated the contactless communication tag;
wherein the tag data comprises encoded tag data associated with a contactless communication tag in response to a reader signal of the at least one computing device;
wherein the tag data comprises a tag identifier and a promissory applet identifier;
instructing, dynamically and in real-time, by the at least one processor, the at least one computing device to execute, based on the tag data, an applet associated with the contactless communication tag to:
receive a webpage conveying document content data associated with an applet-linked document based on the applet;
wherein the document content data comprises:
a document identifier data item representing the document identifier,
document content data item representing the document content,
a document recipient data item representing document recipient, and
a document sender data item representing a document sender;
match, in real-time, the document recipient with the document possessor based on the document recipient identifier;
generating, dynamically and in real-time, by the at least one processor, an account link linking the tag identifier to a user account associated with the document possessor where the document possessor matches the document recipient;
generating, dynamically and in real-time, by the at least one processor, a document entry in the user account for the applet-linked document based on the account link between the tag identifier and the user account, wherein the document entry stores the document content data;
receiving, by the at least one processor, a transfer request comprising the tag identifier and a requested document content data item representing a quantity to transfer from the user account;
accessing, by the at least one processor via the account link, the document content data associated with the contactless communication tag of the applet-linked document based at least in part on the tag identifier;
determining, by the at least one processor, a valid transfer request associated with the transfer request based on a comparison of the requested document content data item and the document content data;
transferring, by the at least one processor, a quantity from a sender account linked to the document sender identifier to the user account based on the document content data and the valid transfer request;
updating, by the at least one processor, a current status of the applet-linked document to indicate the transfer of the quantity; and
updating, by the at least one processor, the webpage to indicate the current status of the applet-linked document.

12. The method of claim 11, further comprising:
determining, by the at least one processor, a user authentication for an application in communication with the contactless reader; and
decoding, by the at least one processor, the tag data in the application.

13. The method of claim 12, further comprising:
generating, by the at least one processor, the applet within the application using the user authentication; and
generating, by the at least one processor, the account link based on the user authentication.

14. The method of claim 11, further comprising:
receiving, by the at least one processor, an authentication request associated with the user account to access the webpage;
determining, by the at least one processor, an authentication of the user account linked to the tag identifier via the account link; and
causing to display, by the at least one processor, the document content data and a current status of the applet-linked document via the webpage.

15. The method of claim 11, wherein the document comprises a check.

16. The method of claim 11, wherein the contactless communication tag comprises a near field communication (NFC) chip.

17. The method of claim 11, wherein the contactless reader comprises a smartphone.

18. A system comprising:
an applet-linked document comprising document fields comprising:
  a document identifier that identifies the applet-linked document,
  a document content,
  a document recipient, and
  a document sender;
a contactless communication tag configured to emit a contactless radio signal in response to a reader signal from at least one computing device;
  wherein the contactless communication tag is attached to the applet-linked document; and
at least one processor of at least one computing device via an antenna module from a contactless reader of the at least one computing device;
  wherein the at least one processor is configured to implement instructions causing the at least one processor to perform steps to:
    receive a contactless radio signal data, comprising tag data associated with a contactless communication tag;
      wherein the tag data is extracted from a contactless radio signal emitted by the contactless communication tag in response to a reader signal of the at least one computing device;
      wherein the tag data comprises a tag identifier and an applet identifier;
    instruct the at least one computing device to execute, based on the tag data, an applet associated with the contactless communication tag to:
      receive, in real-time by user input via the at least one computing device, the document fields of the applet-linked document;
      generate, in real-time, document content data associated with the applet-linked document;
        wherein the document content data comprises:
        a document identifier data item representing the document identifier,
        a document content data item representing the document content,
        a document recipient data item representing the document recipient, and
        a document sender data item representing the document sender;
      write, in real-time, the document content data to a memory of the contactless communication tag so as to enable a subsequent contactless radio signal to carry subsequent tag data comprising the document content data;
    generate, dynamically and in real-time, an account link that links the tag identifier to a user account associated with the at least one computing device;
    generate, dynamically and in real-time, a document entry in the user account for the applet-linked document based on the account link between the tag identifier and the user account, wherein the document entry stored the document content data;
    receive a transfer request comprising the tag identifier and a requested document content data item representing a quantity to transfer from the user account;
    access, via the account link, the document content data associated with the contactless communication tag of the applet-linked document based at least in part on the tag identifier;
    determine a valid transfer request associated with the transfer request based on a comparison of the requested document content data item and the document content data; and
    transfer the quantity from the user account based on the valid transfer request.

* * * * *